United States Patent [19]  [11] 4,401,188
Weis et al.  [45] Aug. 30, 1983

[54] CHAIN SPRAYING APPARATUS

[75] Inventors: Siegfried K. Weis, Byron Center; Charles C. Frost, Ada, both of Mich.

[73] Assignee: C. L. Frost & Son, Inc., Grand Rapids, Mich.

[21] Appl. No.: 251,334

[22] Filed: Apr. 6, 1981

[51] Int. Cl.³ .................................................. F16N 7/14
[52] U.S. Cl. .................................. 184/15 B; 184/96; 184/6.4
[58] Field of Search ............... 184/15 R, 15 A, 15 B, 184/96, 6.4; 366/231; 184/1 C

[56] References Cited

U.S. PATENT DOCUMENTS

| 566,147 | 8/1896 | Della Torre | 184/16 |
|---|---|---|---|
| 807,731 | 12/1905 | Dodge | 474/91 |
| 919,668 | 4/1909 | Williams | 366/231 |
| 1,502,083 | 7/1924 | Zoelly | 74/464 |
| 1,914,093 | 6/1933 | Adams | 184/15 R |
| 1,933,464 | 10/1933 | West et al. | 184/2 |
| 1,990,408 | 2/1935 | Kersl et al. | 184/2 |
| 2,543,495 | 2/1951 | Henry | 366/231 |
| 2,558,370 | 6/1951 | Miller | 184/15 R |
| 2,570,179 | 10/1951 | Rivers | 184/2 |
| 2,624,423 | 1/1953 | Moore | 184/15 R |
| 2,675,098 | 4/1954 | Cole | 184/102 |
| 2,684,733 | 7/1954 | Freiman | 190/58 R |
| 2,800,199 | 7/1957 | Mlynarek | 184/16 |
| 2,813,599 | 11/1957 | Amberg | 184/16 |
| 2,848,068 | 8/1958 | Abbott et al. | 184/15 A |
| 2,908,355 | 10/1959 | Moore | 184/15 R |
| 2,909,937 | 10/1959 | Williams | 474/91 |
| 2,920,720 | 1/1960 | Hemsley | 184/15 A |
| 2,951,557 | 9/1960 | Jung | 184/102 |
| 2,990,916 | 7/1961 | Hillard et al. | 184/15 R |
| 2,998,865 | 9/1961 | Geissler | 184/15 A |
| 3,073,415 | 1/1963 | Dutton et al. | 184/15 A |
| 3,113,337 | 12/1963 | Lyden | 184/15 R |
| 3,116,810 | 1/1964 | Olson | 184/15 R |
| 3,155,192 | 11/1964 | James | 264/53 |
| 3,229,808 | 1/1966 | Olson | 15/21 R |
| 3,424,022 | 1/1969 | Greenberg et al. | 74/468 X |
| 3,430,927 | 3/1969 | Pouzar | 366/231 X |
| 3,599,753 | 8/1971 | Walsh | 184/15 A |
| 3,672,468 | 6/1972 | Schuster | 184/15 A |
| 3,684,059 | 8/1972 | Stoner | 184/15 B |
| 3,762,504 | 10/1973 | Banyas et al. | 184/15 A |
| 3,771,623 | 11/1973 | Sugawara et al. | 184/15 A |
| 3,822,607 | 7/1974 | Tharaldsen | 74/468 |
| 3,869,023 | 3/1975 | Thomson et al. | 184/15 A |
| 3,895,690 | 7/1975 | Thomson et al. | 184/15 A |
| 4,009,764 | 3/1977 | Hafner | 184/15 A |
| 4,024,930 | 5/1977 | Thomson et al. | 184/15 B |
| 4,085,821 | 4/1978 | Kast et al. | 184/15 A |
| 4,089,295 | 5/1978 | Thomson et al. | 118/316 |
| 4,126,207 | 11/1978 | Dibowski et al. | 184/1 C |
| 4,159,046 | 6/1979 | Frost et al. | 184/15 A |

FOREIGN PATENT DOCUMENTS

| 1937930 | 2/1970 | Fed. Rep. of Germany . |
|---|---|---|
| 2436582 | 2/1976 | Fed. Rep. of Germany . |
| 238580 | 8/1926 | United Kingdom . |
| 392146 | 4/1933 | United Kingdom . |
| 448793 | 6/1936 | United Kingdom . |
| 613221 | 11/1948 | United Kingdom . |
| 767219 | 1/1957 | United Kingdom . |
| 911755 | 11/1962 | United Kingdom . |
| 1022476 | 3/1966 | United Kingdom . |
| 144181 | 3/1961 | U.S.S.R. . |
| 174110 | 11/1963 | U.S.S.R. . |

Primary Examiner—David H. Brown
Attorney, Agent, or Firm—Price, Heneveld, Huizenga & Cooper

[57] ABSTRACT

A chain spraying apparatus includes a generally circular sprocket having a plurality of teeth secured thereto. A liquid supply tank is supported on the sprocket for rotation therewith. The tank and sprocket are supported adjacent a chain so that the teeth will engage the chain, causing the sprocket and tank to rotate. Spray nozzles are carried by the disc and positioned by the teeth. Each spray nozzle is connected to a mechanical pump which in turn is connected to the liquid supply tank. The mechanical pump includes a cam actuated plunger which reciprocates the plunger when the teeth engage the chain and rotate the sprocket. A flip-up flag indicator and an agitator are provided.

27 Claims, 9 Drawing Figures

CHAIN SPRAYING APPARATUS

BACKGROUND OF THE INVENTION

The present invention relates to chain spraying or lubricating apparatus and more particularly to a unique device which is self-contained, driven by the chain and which sprays a lubricant or other liquid to the friction or wear areas of the chain.

Various forms of overhead and infloor chain conveyors are presently available. Such conveyors are used in manufacturing facilities for transportation of parts on assembly lines, in warehouses or in various processing plants. Overhead chain conveyors typically include an elongated I-beam from which the chain is supported by a plurality of trolley assemblies. In order to insure proper operation of such systems, it is important that the pins connecting adjacent links be properly lubricated. With any oiling system or spraying apparatus, it is also important that the liquid be properly directed and that excess spray be avoided. In the food handling industries, for example, excessive lubricant dripping cannot be tolerated.

Various forms of chain lubricators and/or sprayers have heretofore been proposed for use with overhead chain systems and infloor chain or tow line conveyors. Such systems typically employ remote oil storage or reservoir tanks, motor driven pumps, and trip devices for activating a liquid spray. Such prior devices may be bulky, expensive and can result in excessive liquid spraying. Further, the liquid is not always properly directed to the high wear areas of the chain.

Commonly owned U.S. Pat. No. 4,159,046, entitled CHAIN LUBRICATION APPARATUS AND METHOD and issued on June 26, 1979, to Frost et al discloses a device which overcomes some of these prior problems. In one embodiment of the invention disclosed therein, the chain lubrication apparatus includes an oil tank supported on the overhead conveyor trolley beam. A sprocket wheel having a plurality of teeth is rotatably supported adjacent the chain so that the teeth are engaged by the chain. Each tooth supports a pair of spray nozzles. A metering valve, connected to the oil tank, is sequentially connected to each of the nozzles. The metering valve is air operated through a stationarily mounted air valve which is tripped by members on the sprocket. In a still further embodiment disclosed in this patent, a mechanically actuated piston or plunger forces liquid through internal conduits in a tooth to the spray nozzles. The plunger is actuated by a cam follower engaging a cam track.

Still further examples of prior lubricating or spraying systems may be found in U.S. Pat. No. 4,024,930, entitled LUBRICATING DEVICE AND METHOD and issued on May 24, 1977, to Thomson et al and U.S. Pat. No. 4,085,821, entitled LUBRICATION SYSTEM and issued on Apr. 25, 1978, to Kast et al. The system disclosed in U.S. Pat. No. 4,024,930 passes lubricating fluid through an inlet line into a shaft and to a piston chamber. The lubricating fluid is evacuated to a discharge device located on a sprocket. The sprocket and pump body defining the piston chamber are rotatably mounted. The pump is connected to a stationary tank through a lubricating inlet manifold.

The system disclosed in U.S. Pat. No. 4,085,821 includes a motor driven piston metering pump which delivers lubricant to a plurality of outlet ports. The outlet ports communicate with individual conduits which deliver lubricant to various portions of the conveyor system. A control unit including an electrical switch and a feeler arm control a clutch which connects the electric motor with a pump shaft.

SUMMARY OF THE INVENTION

A need exists for a chain spraying apparatus which is compact, essentially self-contained and which requires no external source of power for operation and whereby the problems heretofore experienced are substantially eliminated. Essentially, the apparatus in accordance with the present invention includes a rotatably supported liquid supply tank and means coupled to the tank which is adapted to engage the chain for rotating the tank as the chain moves. Spray means are provided which are positioned by the rotation means and which spray a liquid onto the chain as the chain moves.

In narrower aspects of the invention, the spray means includes a nozzle and a mechanical pump interconnecting the nozzle and the supply tank. The pump includes a reciprocating plunger or piston which is actuated by a cam engaging a stationary cam track. Rotation of the supply tank selectively actuates the spray means to direct lubricant to the high wear areas of the chain.

In further aspects of the invention, an indicator means is provided for providing a positive low liquid level indication. In the preferred embodiment of the indicator means, a pop-up flag is tripped by a float disposed within the liquid supply tank. Further, an agitator may be included for insuring proper mixing of the liquid within the tank. Certain lubricants contain dispersions which must be agitated to prevent the particles from settling to the bottom of the oil reservoir or tank. With the agitator incorporated in the present invention, mixing action takes place automatically upon rotation of the tank.

The unique chain spraying apparatus in accordance with the present invention is compact, self-contained and self-propelled. The apparatus does not require an external source of power, such as an electrically driven motor, for operation. Further, problems heretofore experienced with leakage at joints in the lines from a stationary, remote supply tank are eliminated. The device in accordance with the present invention is easily installed, easily maintained and readily disengaged from the chain for maintenance or when oiling is not desired. Further, the device may be used to spray solvents when cleaning of the chain is desired. The liquid spray is directed to the high wear areas of the chain. Excessive spraying is avoided, and the device operates only when the chain is moving.

DETAILED DESCRIPTION OF THE PREFERRED EMBODIMENT

Figure 1:
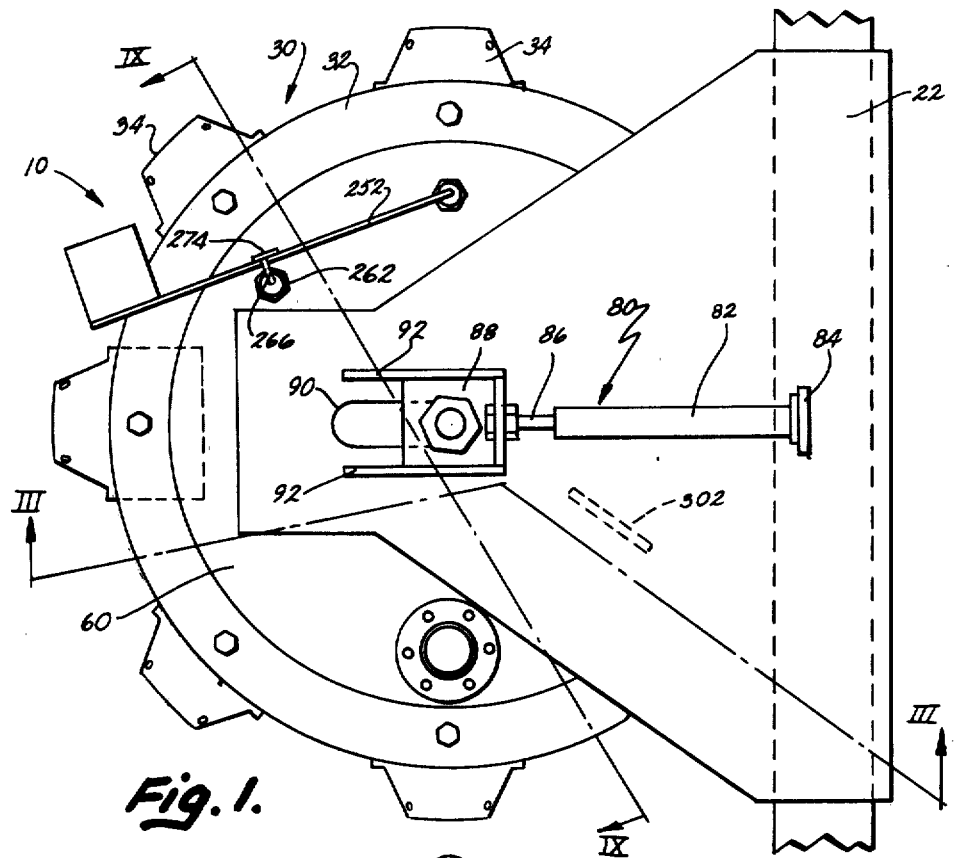
FIG. 1 is a top, plan view of a chain spraying apparatus in accordance with the present invention.
Figure 2:
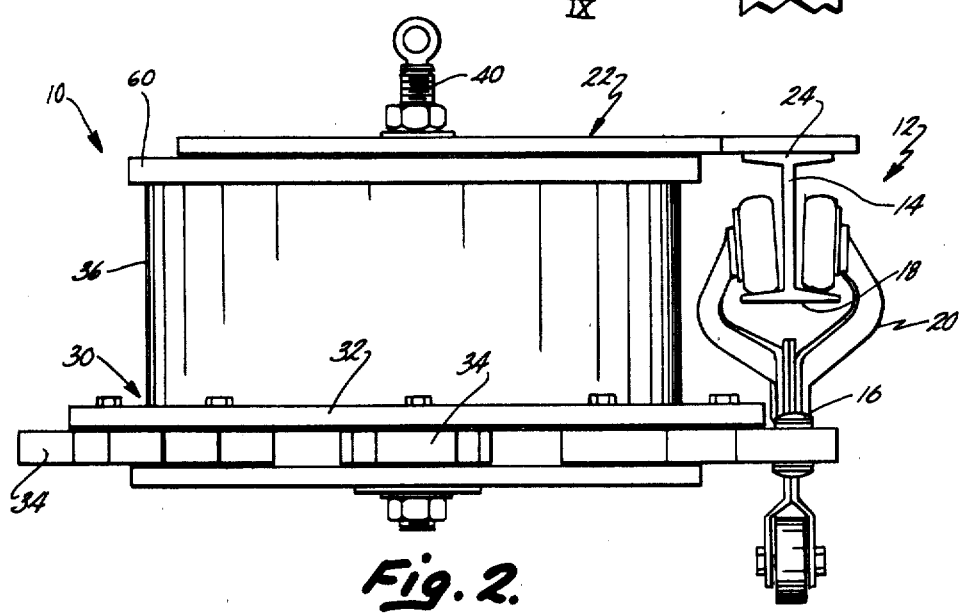
FIG. 2 is a side, elevational view thereof.

A chain spraying device in accordance with a preferred embodiment of the present invention is illustrated in the drawings and generally designated 10. As seen in FIGS. 1 and 2, device 10 is supported immediately adjacent an overhead trolley conveyor 12. Trolley conveyor 12 includes an elongated support beam 14. Suspended from the support beam 14 is a drive chain 16. Chain 16 is suspended from a lower flange 18 of beam 14 by trolley wheel assemblies 20.

Figure 3:
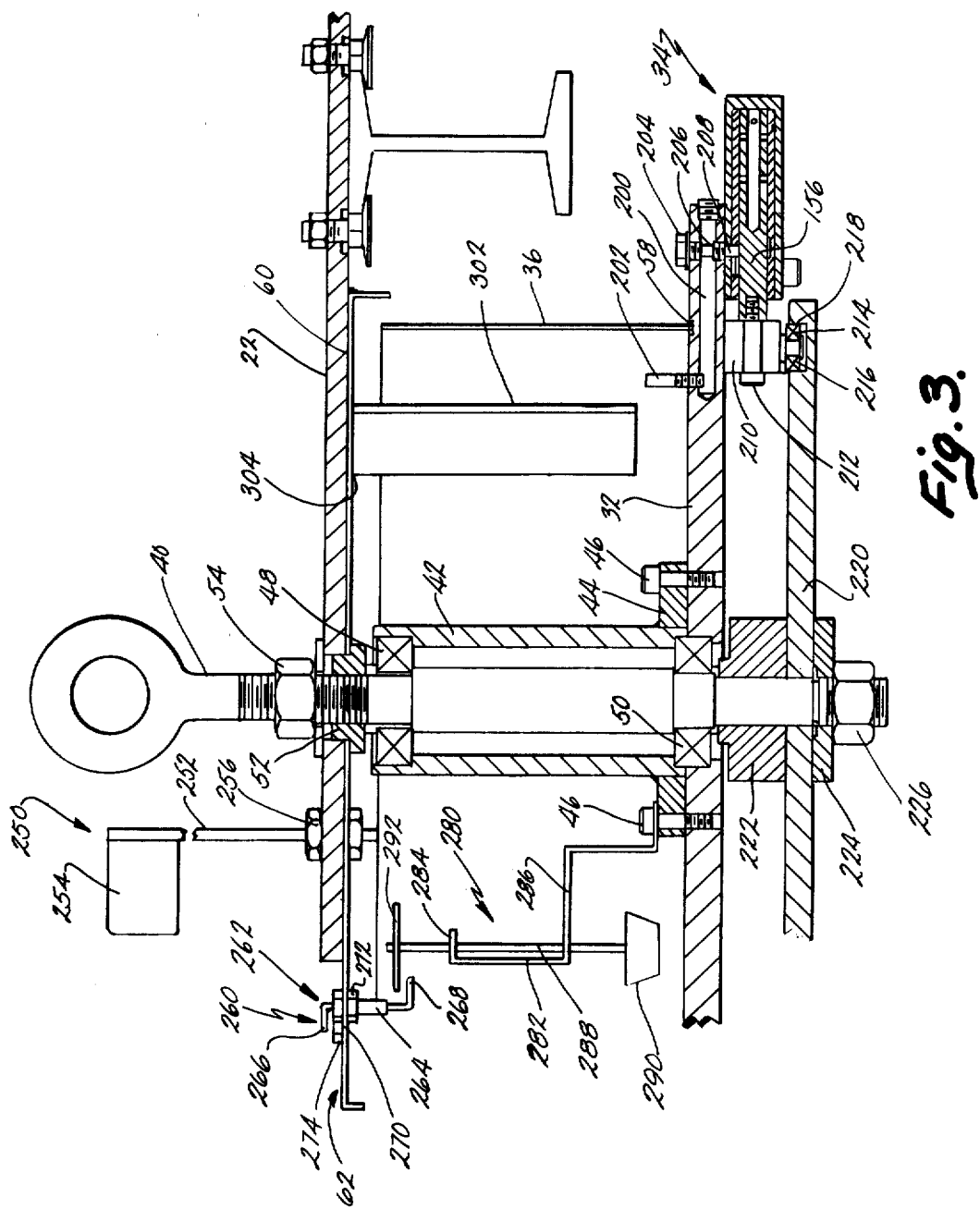
FIG. 3 is a fragmentary, cross-sectional view taken generally along line III—III of FIG. 1.

Device 10 includes a support plate 22 secured to an upper flange 24 of support beam 14. Suspended from support plate 22 is a sprocket assembly 30 having a generally circular disc or wheel 32 and supporting a plurality of teeth 34. A liquid supply tank or reservoir 36 is secured to and carried by sprocket disc 32. As best seen in FIGS. 2 and 3, tank 36 and sprocket assembly 30 are rotatably supported from the support plate 22 by an elongated shaft 40. An elongated, generally tubular bearing housing 42 includes a flange 44 which is secured to disc 32 by suitable fasteners 46. Housing 42 retains an upper bearing assembly 48 and a lower bearing assembly 50. Shaft 40 is secured to plate 22 by a spacer bushing 52 and a suitable nut 54.

As should be apparent from FIG. 3, shaft 40 is stationary and the disc 32 rotates about the shaft on upper and lower bearing assemblies 48, 50. The bearing assemblies are only schematically illustrated in FIG. 3. These may be any of the readily available, conventional ball bearing or roller bearing assemblies.

Figure 9:
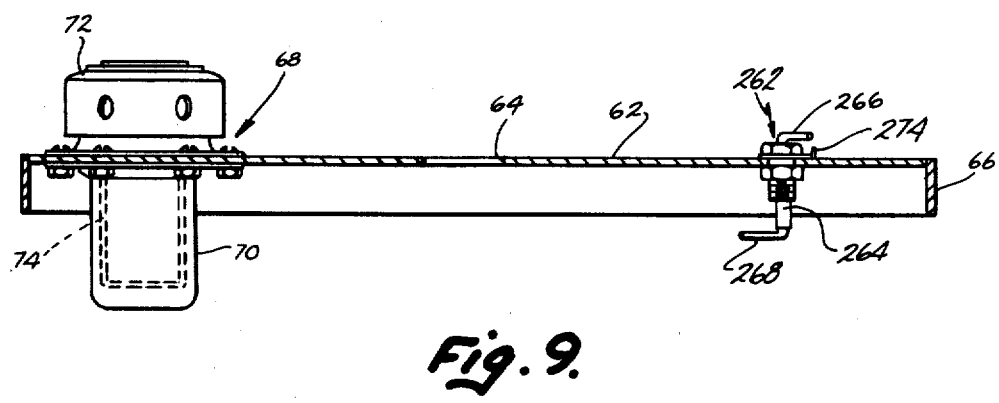
FIG. 9 is a cross-sectional view of the stationary cover taken generally along line IX—IX of FIG. 1.

In the presently preferred embodiment, as seen in FIG. 3, the reservoir or liquid supply tank 36 is defined by a cylindrical sidewall which is secured to disc 32 and sealingly received within a peripheral groove 58. A stationary cover 60 is carried by the support plate 22. As seen in FIGS. 1, 3 and 9, the cover includes a top surface 62 defining a central aperture 64 through which support shaft 40 extends. Cover 60 includes a peripheral skirt 66 which, when in position, surrounds the upper open top of supply tank 36. Also secured to the cover 60 is a fill assembly 68. Fill assembly 68 (FIG. 9) includes a tube 70 extending through a suitable aperture and cover 60 and which is covered by a removable fill cap 72. It is presently preferred that a wire mesh screen 74 (FIG. 9) extend within the fill tube 70 to filter out contaminants in the liquid.

As illustrated in FIG. 1 only, the apparatus may include means for shifting the tank and sprocket assembly towards and away from the chain 16. In the embodiment illustrated, an air actuated piston cylinder assembly 80 includes a cylinder 82 secured at a bracket plate 84 on support plate 22 and a rod 86 secured to an L-shaped bracket 88. Plate 22 defines an elongated slot 90 through which the upper end of the shaft 40 extends. Shaft 40 in the embodiment shown in FIG. 1 is secured to bracket 88. The bracket is disposed within suitable guides 92. As should be apparent, extension and retraction of the piston rod 86 shifts the entire assembly towards and away from chain 16. The actuator 80 may be deleted and a slot 90 would still provide for adjustment in the positioning of the sprocket assembly and teeth with respect to the conveyor chain 16.

Figure 4:
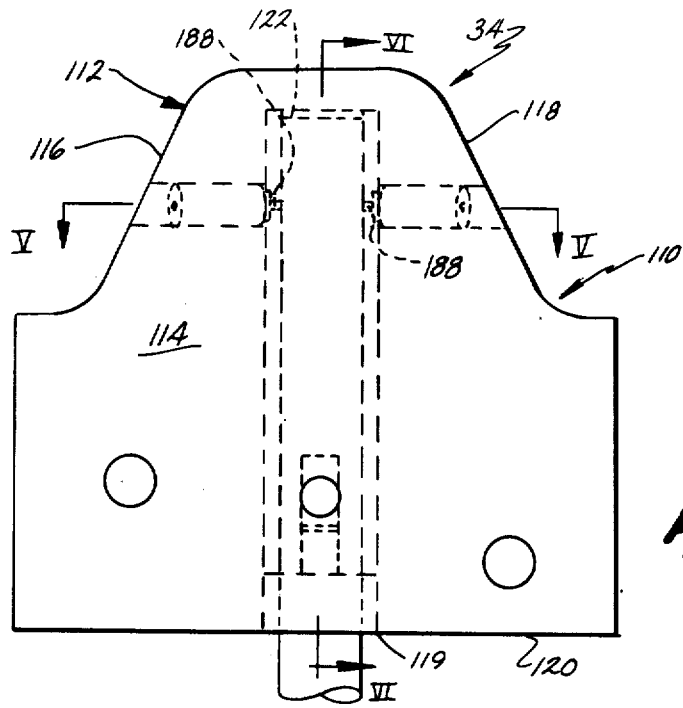
FIG. 4 is a top, plan view of a sprocket tooth incorporated in the present invention.
Figure 5:
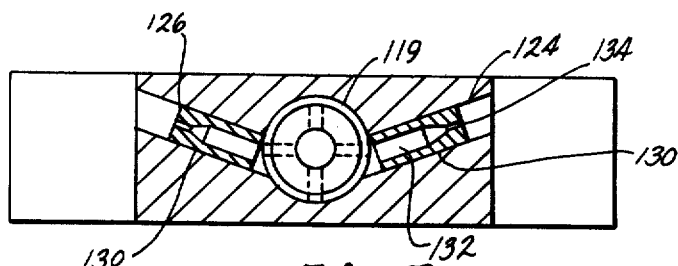
FIG. 5 is a cross-sectional view taken generally along line V—V of FIG. 4.
Figure 6:
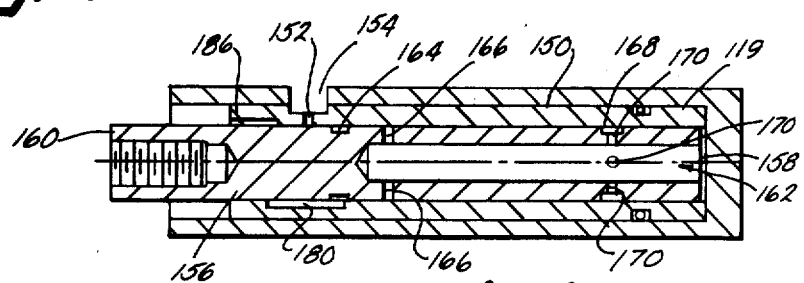
FIGS. 6 and 7 are cross-sectional views taken generally along line VI—VI of FIG. 4 and showing the plunger of the spray means in its forwardmost and rearwardmost positions, respectively.

In accordance with the preferred embodiment of the present invention, each of the teeth 34 enclose and carry a pump and spray assembly which directs liquid or lubricant to the pin areas of the chain. As best seen in FIGS. 4-6, each tooth 34 includes a body 110 defining a sprocket engaging portion 112, an upper surface 114 and sides 116, 118. Each tooth 34 is formed to define an elongated, cylindrical, closed end bore 119. Bore 119 opens through a rear face 120 of the tooth body and is closed at a forward end 122. As seen in FIGS. 4 and 5, nozzle passages or bores 124, 126 open through sides 116, 118 of the tooth. The nozzle passages also open into the central closed bore 119. Disposed within each of the nozzle bores 124, 126 are spray nozzles 130. The spray nozzles each define a stepped bore 132 which terminates in a spray orifice 134. The nozzles and nozzle passages are angled upwardly with respect to a longitudinal axis of the tooth body. As explained in U.S. Pat. No. 4,159,046, this is done so that the liquid spray is directed to the pin areas of the chain.

In the embodiment shown, a cylindrical sleeve 150 is inserted within elongated bore 119. Sleeve 150 defines an inlet port 152 which opens into an aperture 154 defined by upper surface 114 of the tooth. Slidably disposed within sleeve 150 for reciprocating movement is a plunger or piston 156. Plunger 156 is a generally cylindrical member having a front end 158 and a rear end 160. The plunger body defines an elongated blind bore 162 which opens through front face 158. Plunger 156 further defines a circumferentially extending oil receiving or collecting groove 164. In the preferred embodiment, groove 164 extends circumferentially around the entire periphery of the plunger. The plunger further defines a plurality of inlet ports or passages 166 which extend from the blind bore 162 and open through the outer peripheral surface of the plunger. The plunger further defines a forwardly located circumferentially extending groove 168. A plurality of outlet ports or passages 170 extend from blind bore 162 and open into the outlet groove 168.

Sleeve 150, as seen in FIGS. 4, 5 and 6, further defines an axially or longitudinally extending liquid reservoir or collection groove 180. Groove 180 is positioned opposite the inlet port 152. Sleeve 150 further defines an air inlet passage or groove 186 which extends from the rear end of the sleeve 150 and terminates at a point rearwardly of the inlet port 152. Further, sleeve 150, as seen in FIGS. 4 and 5, defines outlet ports or passages 188 which are aligned with the nozzle bores 124.

As seen in FIG. 3, the sprocket disc 32 is provided with a plurality of passages 200. Inlet pipes 202 communicate with the interior of the supply tank 36 with passages 200. Extending into each passage 200 is a metering means 204. Metering means 204 in the embodiment shown is a drilled bolt which defines an inlet passage 206 and a through passage 208. Metering means 204 is positioned so that it extends into aperture 154 of its respective tooth. As should be apparent, liquid from the tank 36 will flow under the action of gravity through pipe 202, passage 200, the passages of the metering means 204 and into the inlet port 152 of sleeve 150.

Figure 7:
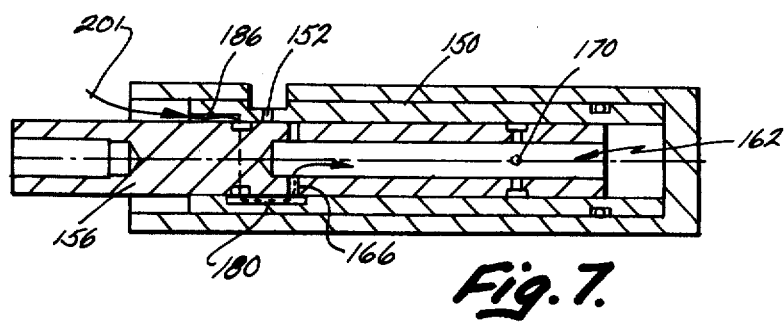

As should be apparent from FIGS. 6 and 7, a plunger 156 is positionable in a first position at which inlet port 152 is aligned with the oil receiving or collecting groove 164. When so positioned, oil or other liquid will flow into the groove 164 and be collected in the reservoir groove 180 defined by sleeve 150. As the plunger 156 is drawn rearwardly or to the left, when viewed in FIGS. 6 and 7, the inlet passages 166 defined by plunger 156 will open into the reservoir 180. Upon rearward movement of the plunger, a vacuum will be created at the forward portion of the plunger chamber or closed bore 119. This causes the liquid to be drawn through passages 166. Also, the vacuum is relieved when the oil receiving or collecting groove 164 opens into the air passage 186. This position of the plunger is shown in FIG. 7. When in this position, air will flow along the path designated by the arrowed line 201. The air will pass through the air passage 186 around a circumferential groove 164, be entrained with the liquid and communicated with the blind bore 162 of the plunger through the oil receiving groove 180 and the inlet passages or ports 166. When the air is drawn in in this manner, it mixes with the liquid which has collected within the collection or reservoir groove 180. When the device is used to lubricate a chain, this insures that the lubricant is atomized so that a better spraying action is obtained.

After the air has been entrained in the oil which passes into the blind bore 162, plunger 156 is moved forwardly until the outlet ports or passages 170 are aligned with the nozzle bores 124 and the sleeve outlet ports 188. As the plunger moves forwardly to this alignment position, the pressurized liquid is ejected from the nozzles as an atomized spray.

Figure 8:
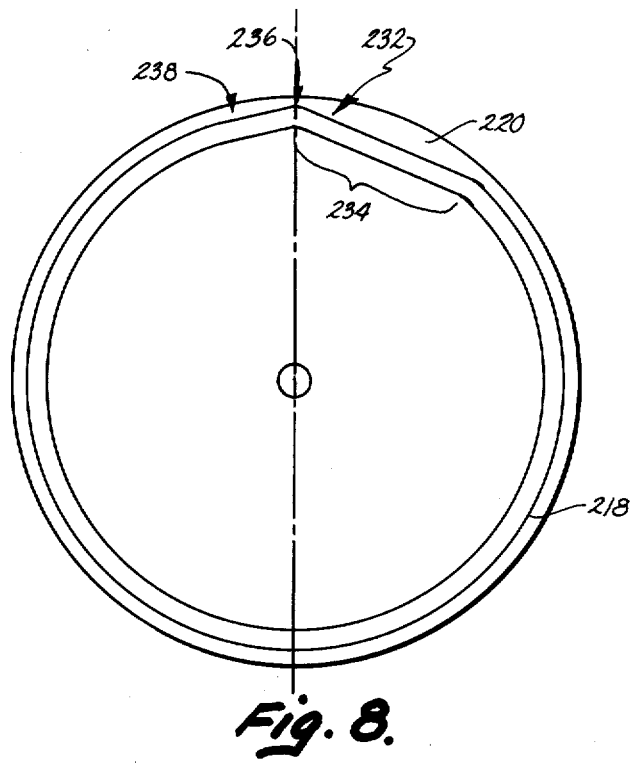
FIG. 8 is a top, plan view of a cam plate and track.

In accordance with the present invention, reciprocation of the plunger 156 within its plunger chamber is accomplished by a cam means shown in FIGS. 3 and 8. As shown therein, a block 210 is secured to a rear end of the plunger 156 by any suitable means, such as a fastener 212. Secured to the undersurface of the block 210 is a rotatable cam follower 214. Cam follower 214 is a rotatable disc or wheel which rotates on an axle 216. Cam follower 214 is disposed within a cam track 218 defined by a generally circular cam plate 220. The cam plate is supported from shaft 40 in a nonrotatable fashion by a suitable spacer 222, washer 224 and nut 226 (FIG. 3). As seen in FIG. 8, cam track 218 is generally circular in configuration. A portion 232 of the cam track deviates from the circular configuration in order to reciprocate and/or properly actuate the plunger 156. Cam track 218 is dimensioned so that the plungers are normally held in a position within their respective closed bores at which the oil receiving grooves 164 are aligned with their respective inlet ports or passages 152. As the tank and sprocket rotate and hence as the cam follower moves within the track, the follower will come along a first generally straight line portion 234 of the cam track. This portion will shift the plunger 156 to the left, when viewed in FIG. 7, so that the air passage is placed in communication with the inlet ports of the plunger. Portion 234 then causes the plunger to shift to the right, when viewed in FIG. 7, to accomplish pumping action. The pumping action is terminated at the peak 236 of the cam track when the plunger is at its extreme forward position within the closed bore, as seen in FIG. 6. At this position, the outlet ports of the plunger and sleeve are aligned with the nozzle bores. The cam track further includes another portion 238 which draws the plunger back into its initial or start position. As the tank continues to rotate, the plunger will remain in this position until the cam follower enters portion 234 of the cam track. Spraying, therefore, is accomplished sequentially and only when a tooth is engaging the moving chain.

As seen in FIGS. 1 and 3, a unique positive indicator is provided for showing or indicating when a liquid level in tank 36 is low. The indicator includes a flag 250 having a flexible post 252 and a flag portion 254. Post 252 is preferably a tightly wound coil spring which is secured to support plate 22 by a suitable means 256. Positioned on the stationary cover 60 is a rotatable catch assembly 260. Catch assembly 260 includes an elongated, generally S-shaped member 262 having an elongated vertical portion 264 and upper and lower legs 266, 268. Member 262 is rotatably supported within a drilled bolt 270 which is secured to the cover at a suitable aperture by a nut 272. Positioned immediately adjacent member 262 is a bracket or plate 274. As shown in FIG. 1, post or pole 252 of the flag assembly may be bent or flexed downwardly and placed between bracket 274 and the undersurface of leg portion 266 of catch 262. Should the catch be rotated, the flag would be released. The flag will flex or pop up to a vertical position providing a positive indication of a low liquid level condition.

As shown in FIG. 3, catch 262 is rotated by a float assembly 280. Float assembly 280 includes a bracket 282 secured to flange 44 of bearing housing 42. Bracket 282 has vertically spaced leg portions 284, 286 defining aligned apertures through which a shaft 288 extends. Secured to the lower end of the shaft 288 is a suitable float 290. The upper end of the shaft carries a trip member which may be a circular washer 292. As should be readily apparent, as the liquid level within tank 36 drops, the float assembly 280 will move downwardly and towards disc 32. The float assembly, of course, rotates with the disc when the tank is being driven by engagement of the teeth with the chain. When the float 290 drops to a low level position, release member 292 will strike leg portion 268 of catch 262. This will cause the catch to rotate and release the flag pole 252.

Also, as seen in FIGS. 1 and 2, the chain spraying device in accordance with the present invention may include an agitator means to insure that the lubricant or other liquid within tank 36 stays properly mixed. In the preferred embodiment, the agitator means comprises an elongated plate 302 having an upper end 304 secured to the stationary cover 60. Plate 302 extends downwardly into the tank and terminates at a point spaced slightly above disc 32. Also, it is preferred, as seen in FIG. 1, that the plate 302 extend generally radially from the central rotational axis of the tank. Since the tank rotates with respect to stationary cover 60, the lubricant would be carried thereby and into contact with the plate 302. This insures that the lubricant will be mixed and agitated. As a result, any dispersions within the lubricant will not settle out of the liquid carrier.

OPERATION

In operation, the lubricating device 10 in accordance with the present invention is mounted and positioned adjacent the chain 16 so that the individual teeth 34 may move into driving engagement with the chain. As the chain moves, the teeth 34 are moved, causing disc 32 and tank 36 to rotate. The plungers 156 are actuated by the respective cam followers 214 riding within the cam track 218 defined by plate 220. The plungers are actuated only when the tooth is disposed within and engaged by the chain. The liquid within tank 36 is metered to the respective tooth and pumped through the nozzles 130 to spray the pins of the chain. The device insures that an atomized spray of liquid is directed to the chain.

When the liquid level within the tank drops to a low level, the float mechanism 280 will trip the catch 262 rotating it. The pop-up flag 250 then indicates to the operator that the tank needs refilling.

The device in accordance with the present invention is essentially self-contained, and no external source of power is necessary for its operation. The pumping and spraying action is achieved by engagement of the teeth with the chain. It therefore derives its "power" from the chain itself. Further, since pumping action is accomplished only upon chain movement, excess lubrication, dripping and other problems heretofore experienced are eliminated. The device is usable as an idler in the conveyor system and can replace an idler sprocket at a turn, for example. Also, the device can be used to spray a solvent onto the chain for cleaning. A pressurized stream of solvent, as opposed to an air mix, can be obtained by blocking off air passages 186.

In view of the foregoing description, those of ordinary skill will undoubtedly envision various modifications to the invention which would not depart from the inventive concepts disclosed herein. For example, the spray means including the pump or plunger 156 and nozzles need not necessarily be carried by and/or formed as part of each of the tooth assemblies. The spray means could be mounted on separate members which would be positioned by the teeth. Also, other indicators of low level conditions might be employed besides the unique pop-up flag structure disclosed.

Therefore, it is expressly intended that the above description should be considered as only that of the preferred embodiment. The true spirit and scope of the present invention may be determined by reference to the appended claims.

The embodiments of the invention in which an exclusive property or privilege is claimed are defined as follows:

1. An automatic, self-powered, chain lubricating apparatus adapted to be engaged by a chain and spray the chain with a lubricant, solvent and the like, said apparatus including:
   a generally circular disc having a plurality of teeth supported thereon, said teeth dimensioned to be engaged by the chain so that said disc rotates as the teeth engage the chain and are moved thereby;
   a liquid supply tank;
   support means connected to said disc for rotatably supporting said disc adjacent a chain;
   at least one spray nozzle carried by said disc and positioned by said teeth; and
   pump means interconnecting said liquid supply tank with said spray nozzle for pumping a liquid from said tank to said nozzle, said pump means including:
   a housing defining an elongated chamber and an inlet passage, said inlet passage connected to said supply tank;
   a plunger disposed within said chamber and shiftable longitudinally thereof; and
   cam means engaging said plunger for reciprocating said plunger within said chamber as the result of rotation of said disc to thereby pump a liquid to said spray nozzle, said plunger comprising an elongated, generally cylindrical body, said body having a rear end and a front end, said body defining a blind bore opening through said front end, said body further defining a circumferentially extending liquid collection groove adjacent said rear end, an inlet passage extending into said blind bore and an outlet passage extending from said blind bore to the outer periphery of said body, and wherein said housing defines a spray port alignable with said body outlet passage and connected to said nozzle.

2. An apparatus as defined by claim 1 further including:
   liquid level indicating means for automatically indicating when the liquid supply tank is low on liquid.

3. An apparatus as defined by claim 1 further including agitator means disposed within said tank for agitating a liquid within said tank.

4. An apparatus as defined by claim 3 wherein said agitator means comprises:
   a baffle plate fixed to said support means and extending into said tank.

5. An apparatus as defined by claim 1 wherein said housing further defines:
   a liquid collection reservoir for collecting liquid when the plunger is positioned so that said oil collecting groove is aligned with said housing inlet passage.

6. An apparatus as defined by claim 5 wherein said housing further defines an air inlet passage opening into said chamber, said air inlet passage, said liquid collecting reservoir and said plunger inlet passage positioned so that said plunger may be shifted rearwardly creating a vacuum at its forward end and said air inlet may be placed in communication with said blind bore through said liquid collection reservoir and said plunger inlet passage whereby air will be mixed with the liquid pumped by said pump means to said nozzle.

7. An apparatus as defined by claim 4 further including:
   liquid level indicating means for automatically indicating when the liquid supply tank is low on liquid.

8. An apparatus as defined by claim 7 wherein said liquid level indicating means comprises:
   a rotatable catch carried by said support means;
   a float;
   a bracket secured for rotation with said tank for supporting said float for vertical movement within said tank, said float including a release member which engages said rotatable catch when said float is lowered by a low liquid level; and
   a self-erecting flag having a flexible post normally held in a lowered position by said catch but which flexes to a raised position when said catch is rotated by said release member.

9. An apparatus as defined by claim 7 further including agitator means disposed within said tank for agitating a liquid within said tank.

10. An apparatus as defined by claim 9 wherein said agitator means comprises:
    a baffle plate fixed to said support means and extending into said tank.

11. An automatic, self-powered, chain lubricating apparatus adapted to be engaged by a chain and spray the chain with a lubricant, solvent and the like, said apparatus including:
    a generally circular disc having a plurality of teeth supported thereon, said teeth dimensioned to be engaged by the chain so that said disc rotates as the teeth engage the chain and are moved thereby;
    a liquid supply tank mounted on said disc for rotation therewith;
    support means connected to said disc for rotatably supporting said disc adjacent a chain;
    at least one spray nozzle carried by said disc and positioned by said teeth;

pump means interconnecting said liquid supply tank with said spray nozzle for pumping a liquid from said tank to said nozzle; and liquid level indicating means for automatically indicating when the liquid supply tank is low on liquid, and wherein said liquid level indicating means comprises:
a rotatable catch carried by said support means;
a float;
a bracket secured for rotation with said tank for supporting said float for vertical movement within said tank, said float including a release member which engages said rotatable catch when said float is lowered by a low liquid level; and
a self-erecting flag having a flexible post normally held in a lowered position by said catch but which flexes to a raised position when said catch is rotated by said release member.

12. A chain spraying apparatus for spraying a liquid onto a chain, said apparatus comprising:
a liquid supply tank;
support means engaging said tank for rotatably supporting said tank adjacent a moving chain;
rotation means coupled to said tank and adapted to engage the chain for rotating the tank as the chain moves;
spray means positioned by said rotation means for spraying a liquid from said tank onto the chain as the chain moves, said spray means including:
a nozzle; and
pump means connected to said nozzle and said tank for pumping liquid to said nozzle, said pump means including a reciprocating plunger and drive means for reciprocating said plunger, said drive means being powered by rotation of said tank and wherein said pump means includes:
a body having a front end, a rear end and sides, said body defining a chamber closed at the front end and opening through the rear end of said body, said body further defining a nozzle in flow communication with said chamber and an inlet port connected to said source and opening into said chamber; and
a plunger slidably disposed within said chamber, said plunger having an elongated cylindrical body defining a liquid receiving groove, a blind bore opening towards the front end of the chamber, an inlet passage extending between the blind bore and the outer surface of said body and an outlet passage spaced from said inlet passage and extending between said blind bore and said outer surface, said chamber having an inner surface defining a liquid reservoir groove.

13. A chain spraying apparatus as defined by claim 12 wherein said drive means of said pump means comprises:
a cam follower connected to said plunger; and
a cam engaging said cam follower for reciprocating said cam follower as said tank rotates.

14. A chain spraying apparatus as defined by claim 12 further including agitator means disposed within said tank for agitating a liquid within said tank.

15. A chain spraying apparatus as defined by claim 12 further including positioning means on said support means for shifting said rotation means towards and away from the chain.

16. A chain spraying apparatus as defined by claim 12 wherein said chamber inner surface further defines an air groove opening through the body rear end and positioned so that air is drawn into said liquid reservoir groove when said plunger is shifted to a rearward position.

17. A chain spraying apparatus as defined by claim 12 wherein said rotation means comprises:
a disc, said tank being mounted on said disc; and
a plurality of teeth carried around the periphery of said disc and dimensioned to be engaged by the chain.

18. A chain spraying apparatus as defined by claim 17 wherein said spray means is carried by one of said teeth and said one of said teeth defines said body of said spray means.

19. A chain spraying apparatus as defined by claim 12 further including:
indicator means disposed in part within said tank for providing a positive indication of a low liquid level condition.

20. A chain spraying apparatus as defined by claim 19 further including agitator means disposed within said tank for agitating a liquid within said tank.

21. A chain spraying apparatus as defined by claim 20 further including positioning means on said support means for shifting said rotation means towards and away from the chain.

22. A chain spraying apparatus as defined by claim 19 wherein said liquid level indicating means comprises:
a rotatable catch carried by said support means;
a float;
a bracket secured for rotation with said tank for supporting said float for vertical movement within said tank, said float including a release member which engages said rotatable catch when said float is lowered by a low liquid level; and
a self-erecting flag having a flexible post normally held in a lowered position by said catch but which flexes to a raised position when said catch is rotated by said release member.

23. A chain spraying apparatus as defined by claim 22 further including agitator means disposed within said tank for agitating a liquid within said tank.

24. A chain spraying apparatus for spraying a liquid onto a chain, said apparatus comprising:
a liquid supply tank;
support means engaging said tank for rotatably supporting said tank adjacent a moving chain;
rotation means coupled to said tank and adapted to engage the chain for rotating the tank as the chain moves;
spray means positioned by said rotation means for spraying a liquid from said tank onto the chain as the chain moves, said spray means including;
a nozzle;
pump means connected to said nozzle and said tank for pumping liquid to said nozzle, said pump means including a reciprocating plunger and drive means for reciprocating said plunger, said drive means being powered by rotation means comprising:
a disc, said tank being mounted on said disc; and
a plurality of teeth carried around the periphery of said disc and dimensioned to be engaged by the chain, at least one of said teeth defines an elongated, generally cylindrical bore having an open rear end and a closed front end, and a nozzle bore opening through a surface of said tooth and into said cylindrical base, said nozzle being disposed within said nozzle bore and said plunger being disposed within said cylindrical bore, said at least one of said teeth defines a liquid inlet port connected to said supply tank and said plunger comprises:

a plunger body having a rear end extending out of said cylindrical bore and a front end, said body further defining a blind passage open through said body front end, said plunger body defines a liquid receiving groove opening through the outer periphery of said body and alignable with said liquid inlet port, an inlet port opening into said blind passage and an outlet port opening into said blind passage and alignable with said nozzle base, said receiving groove, inlet port and outlet port being spaced from each other longitudinally of said plunger body, said elongated, cylindrical bore has an inner peripheral surface defining a longitudinally extending reservoir groove positioned to be in flow communication with said liquid receiving groove when said receiving groove is aligned with said inlet port, and wherein said elongated, cylindrical bore inner peripheral surface further defines an air inlet groove opening through the bore rear end, said air inlet groove positioned to communicate air to said reservoir groove through said liquid receiving groove when said plunger is shifted rearwardly and said plunger inlet port opens into said reservoir groove whereby air will be mixed with liquid within said reservoir groove and a liquid/air mix will be pumped to said nozzle when said plunger is shifted forwardly.

25. A chain spraying device for spraying a moving chain with a liquid, said device including:

a stationary support;

a shaft nonrotatably fixed to said support;

a liquid supply tank;

bearing means for rotatably mounting the supply tank on said shaft;

an agitator plate fixed to said stationary support and extending into said supply tank to agitate a liquid therein when the tank rotates;

rotation means operatively connected to said tank for rotating said tank about said shaft; and liquid spray means operatively connected to said supply tank for spraying a liquid onto a moving chain; said rotation means comprising a sprocket rotatably mounted on said shaft and supporting said tank, said sprocket including a plurality of teeth dimensioned to engage a moving chain; said liquid spray means comprising:

each of said teeth defining a longitudinally extending chamber and at least one nozzle bore intersecting said chamber;

a plunger slidably disposed in said chamber;

cam means engaging said sprocket for reciprocating said plunger within said chamber as said sprocket rotates; and air means defined by said plunger for entraining air with the liquid sprayed by said spray means; said air means including each of said teeth defining a liquid inlet port connected to the supply tank and said chamber has an inner peripheral surface defining a reservoir groove and an air inlet groove, said plunger defining a liquid receiving groove, a blind bore opening through a forward end thereof, a plurality of liquid inlet passages opening into said blind bore and a plurality of liquid outlet passages opening from said blind bore and alignable with said nozzle bore upon shifting of said plunger.

26. A chain spraying device as defined by claim 23 wherein said sprocket defines a liquid passage placing said tank in flow communication with said chamber, said spray means further includes metering means within said sprocket liquid passage for metering liquid to said chamber.

27. A chain spraying device for spraying a moving chain with a liquid, said device including:

a stationary support;

a shaft nonrotatably fixed to said support;

a liquid supply tank;

bearing means for rotatably mounting the supply tank on said shaft;

an agitator plate fixed to said stationary support and extending into said supply tank to agitate a liquid therein when the tank rotates;

rotation means operatively connected to said tank for rotating said tank about said shaft; and liquid spray means operatively connected to said supply tank for spraying a liquid onto a moving chain, said rotation means comprises a sprocket rotatably mounted on said shaft and supporting said tank, said sprocket including a plurality of teeth dimensioned to engage a moving chain, said liquid spray means comprising:

each of said teeth defining a longitudinally extending chamber and at least one nozzle bore intersecting said chamber;

a plunger slidably disposed in said chamber; and cam means engaging said sprocket for reciprocating said plunger within said chamber as said sprocket rotates, and wherein said liquid spray means further includes air means for entraining air with the liquid sprayed by said spray means.

* * * * *